(12) United States Patent
Kuntz

(10) Patent No.: US 7,171,990 B2
(45) Date of Patent: *Feb. 6, 2007

(54) CONTOURED SURFACE DEFUELING FITTING

(75) Inventor: James P. Kuntz, Spokane, WA (US)

(73) Assignee: Spokane Industries, Inc., Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/125,704

(22) Filed: May 10, 2005

(65) Prior Publication Data
US 2006/0254669 A1   Nov. 16, 2006

(51) Int. Cl.
*B65B 1/04* (2006.01)

(52) U.S. Cl. .......................................... 141/65; 184/1.5
(58) Field of Classification Search ................... 141/65, 141/98; 184/1.5
See application file for complete search history.

(56) References Cited

U.S. PATENT DOCUMENTS

| | | | | |
|---|---|---|---|---|
| 4,834,110 A | * | 5/1989 | Richard | ....................... 600/573 |
| 5,078,356 A | * | 1/1992 | Adams | ..................... 248/206.2 |
| 5,117,876 A | * | 6/1992 | Kuntz | ............................ 141/7 |
| 5,878,799 A | * | 3/1999 | Hannick | ..................... 141/351 |
| 6,860,300 B1 | * | 3/2005 | Kuntz | ......................... 141/65 |
| 6,896,013 B2 | * | 5/2005 | Kuntz | ......................... 141/65 |

* cited by examiner

*Primary Examiner*—Steven O. Douglas
(74) *Attorney, Agent, or Firm*—Holland & Hart

(57) ABSTRACT

A method and apparatus for defueling an aircraft. The apparatus includes a defueling fitting comprising one or more structural connectors, which may include one or more suction cups. The suction cups are disposed in a mount. The suction cups may be raised from a surface in the mount and arranged in a non-circular pattern to facilitate connection to contoured surfaces. An actuator assembly may be attached to the mount for opening an aircraft defueling valve. The suction cups may be operatively connected to a vacuum source to connect the defueling fitting to an aircraft body, with the actuator assembly positioned at the aircraft defueling valve. The defueling fitting facilitates safe and convenient defueling of aircraft, even aircraft with significantly contoured surfaces.

29 Claims, 4 Drawing Sheets

CONTOURED SURFACE DEFUELING FITTING

FIELD OF THE INVENTION

The present invention relates to aerospace equipment, and more particularly to a method and apparatus for defueling an aircraft.

BACKGROUND OF THE INVENTION

Aircraft often need to be defueled prior to performing certain types of maintenance or repairs. There are generally three stages of aircraft defueling: pumping (removing the majority of fuel from the aircraft fuel cells), bottom sumping (removing most of the remaining fuel from the bottom of the fuel cells—traditionally done by some type of gravity feed), and depuddling (which involves removing the small puddles remaining in the fuel cells). A number of aircraft defueling systems have traditionally been available to handle the various stages of aircraft defueling. At some point, however, most defueling systems require some type of gravity feed, resulting in low drain rates and long drain times. In fact, for many large aircraft, depending on the amount of fuel remaining in the tanks, it can take up to several hours to fully defuel the aircraft using a gravity dependent system.

More recent defueling systems include a vacuum assist to increase the defueling rate. Vacuum assist defueling systems can evacuate airplane fuel tanks in a fraction of the time normally allocated to a gravity system. Nevertheless, many vacuum assist systems are only useful with specific fuel drain configurations. Thus, the use of such vacuum assist systems is limited to certain aircraft and certain personnel trained to match an inventory of attachments with the design requirements of fuel drain systems of particular aircraft.

Accordingly, a universal coupler described in U.S. Pat. No. 5,117,876 ("the '876 patent"), which is incorporated in its entirety herein by this reference, is intended for use with nearly all aircraft. However, attaching the universal coupler to certain aircraft can be a challenge. Some airplanes, for example, have a surface radii of curvature at drain fuel drain locations that prevent standard universal connectors from being easily attached to the drain valves. Therefore, there is a need for an aircraft defueling apparatus that can be used in a variety of environments, including with aircraft that have contoured surfaces around their drain valves, to minimize the risk of fuel leaks.

SUMMARY OF THE INVENTION

The present invention provides methods and apparatus for defueling aircraft. The apparatus includes a defueling fitting comprising a structural connector, which may include a suction cup. The structural connector may be disposed in a mount, but raised from a mount surface to accommodate attachment to contoured surfaces. In addition, the structural connector may be elliptical to reduce the width of the apparatus. A reduced width also facilitates attachment to contoured surfaces.

According to some aspects of the invention, an actuator assembly is disposed in or attached to the mount for opening an aircraft drain valve. The structural connectors may be operatively connected to a vacuum source to create a pressure differential for connecting the defueling fitting to an aircraft body, with the actuator assembly operatively positioned at the aircraft drain valve.

One embodiment of the invention provides an aircraft defueling fitting comprising a structural connector comprising first and second surfaces, an elliptical seal disposed in the first surface of the structural connector, and an aircraft drain port adjacent to the elliptical seal. The structural connector and the aircraft drain port may be disposed in a single mount. The mount may comprise an elliptical groove projecting from the first surface with the seal disposed in the elliptical groove. The fitting may further comprise a vacuum port disposed in the structural connector. The vacuum port may be operatively connected to a vacuum source at the second surface.

Another embodiment of the invention provides an aircraft defueling fitting comprising an elongated mount having first and second ends, a first non-circular suction area disposed in the first end of the elongated mount, a second suction area disposed in the second end of the elongated mount, and a poppet valve opener disposed in the elongated mount within the second suction area. The first non-circular suction area may comprise a generally elliptical shape having a major elliptical axis substantially parallel to a major axis of the elongated mount. The first non-circular suction area may be defined by a seal disposed in a raised groove of the elongated mount. The elongated mount may comprise an aperture, and the poppet valve opener may be disposed in the aperture. The poppet valve opener may comprise a flanged hub having an internal passageway therethrough and an external trough, a probe inserted at least partially into the flanged hub, and a hub gasket at least partially inserted into the external trough defining extents of the second suction area.

Another aspect of the invention provides an aircraft defueling fitting comprising a mount having first and second ends, a trough arranged in a closed, geometric shape, the trough raised from a mount surface, a first seal disposed in the trough, and a valve actuator assembly attached to the mount at the second end and adapted to open an aircraft fuel tank drain valve. The trough may be raised such that the seal fully seals against a contoured surface having a radius of curvature of one hundred twenty inches or less, seventy-two inches or less, thirty-six inches or less, eighteen inches or less, or four inches or less. The valve actuator assembly may comprise a second seal spaced laterally from the seal disposed in the trough, where the mount comprises a first vacuum port disposed interior to the trough, and a second vacuum port disposed interior to the second seal.

Another aspect of the invention provides a method of removing fuel from an aircraft fuel tank comprising providing an aircraft drain fitting and pneumatically attaching the aircraft drain fitting to an aircraft surface having a radius of curvature of one hundred twenty inches or less, seventy-two inches or less, thirty-six inches or less, eighteen inches or less, or four inches or less. The method may further comprise drawing fuel from the aircraft fuel tank with a vacuum source attached to the aircraft drain fitting. Pneumatically attaching may comprise applying a vacuum to a suction cup of the aircraft drain fitting. The method may further comprise providing an actuator assembly in the aircraft drain fitting for opening an aircraft poppet valve of the aircraft fuel tank and depressing the aircraft poppet valve with the actuator.

Another aspect of the invention provides an aerospace apparatus comprising an aircraft defueling fitting, the fitting comprising a mount, the mount comprising a suction cup and a poppet valve opener spaced laterally from the suction cup.

The defueling fitting facilitates safe and convenient defueling of certain aircraft that have contoured surfaces adjacent to drain valves, as well as aircraft that have flat surfaces adjacent to the drain valves. The defueling fitting described herein may be used in small and tight spaces, and on surfaces with small radii of curvature, even when other conventional defueling fittings are not helpful.

Other features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings.

Throughout the drawings, identical reference numbers and descriptions indicate similar, but not necessarily identical elements.

DETAILED DESCRIPTION OF THE INVENTION

Defueling an aircraft is a common procedure prior to maintenance or repair. Most aircraft include one or more drain valves at low points of the fuel tanks to facilitate defueling. The drain valves are usually spring loaded "poppet" valves that can be opened by applying a force normal to the spring force. The drain valves of most aircraft are substantially flush with the outside body of the aircraft and therefore readily accessible with few or no local obstructions. However, some aircraft include a contoured surface adjacent to the fuel drain valve, which complicates the attachment of conventional drain fittings. Airplane wings, fuselages, and outboard removable pontoon tanks, for example, often exhibit contoured surfaces adjacent to fuel drain valves.

Therefore, the present invention contemplates aircraft defueling fittings and associated methods of defueling with features that facilitate defueling aircraft even at significantly contoured surfaces. The present invention more specifically involves a fitting that attaches to an aircraft body so that an actuator can be placed over the fuel drain valve. The actuator opens the fuel drain valve and allows fuel to drain from the associated fuel tank. The defueling fitting described herein can be used with any aircraft, including without limitation fixed wing aircraft (airplanes) and rotary wing aircraft (helicopters). Such aircraft are normally provided with one or more substantially flush or recess-mounted fuel drains in the wings and/or fuselage.

As used throughout the specification and claims, the term "plate" is used broadly to mean any object, the thickness of which is relatively small or shallow in comparison with the other dimensions of the item. A "plate" can also include a cup, especially a suction cup. "Flange" is also used broadly to mean a rim or plate used to hold an object in place or attach it to another object. "Elliptical" means a shape wherein a locus of points for which the sum of the distances from each point to two fixed points is equal, as well as any other non-circular, generally oval-shaped pattern. "Elongated" means having more length than width or slender. "Circumference" means at or near a boundary line of a figure, area, or object. A "suction cup" is a device designed to adhere to a surface by means of suction. "Adjacent" means close to or lying near. The term "baffle" means a usually static device that regulates or limits the flow of a fluid. The term "hub" is used broadly to indicate a central part or a receiver of other parts. "Vacuum" means lower pressure than local atmospheric pressure. The words "including" and "having," as used in the specification, including the claims, have the same meaning as the word "comprising."

Figure 1:
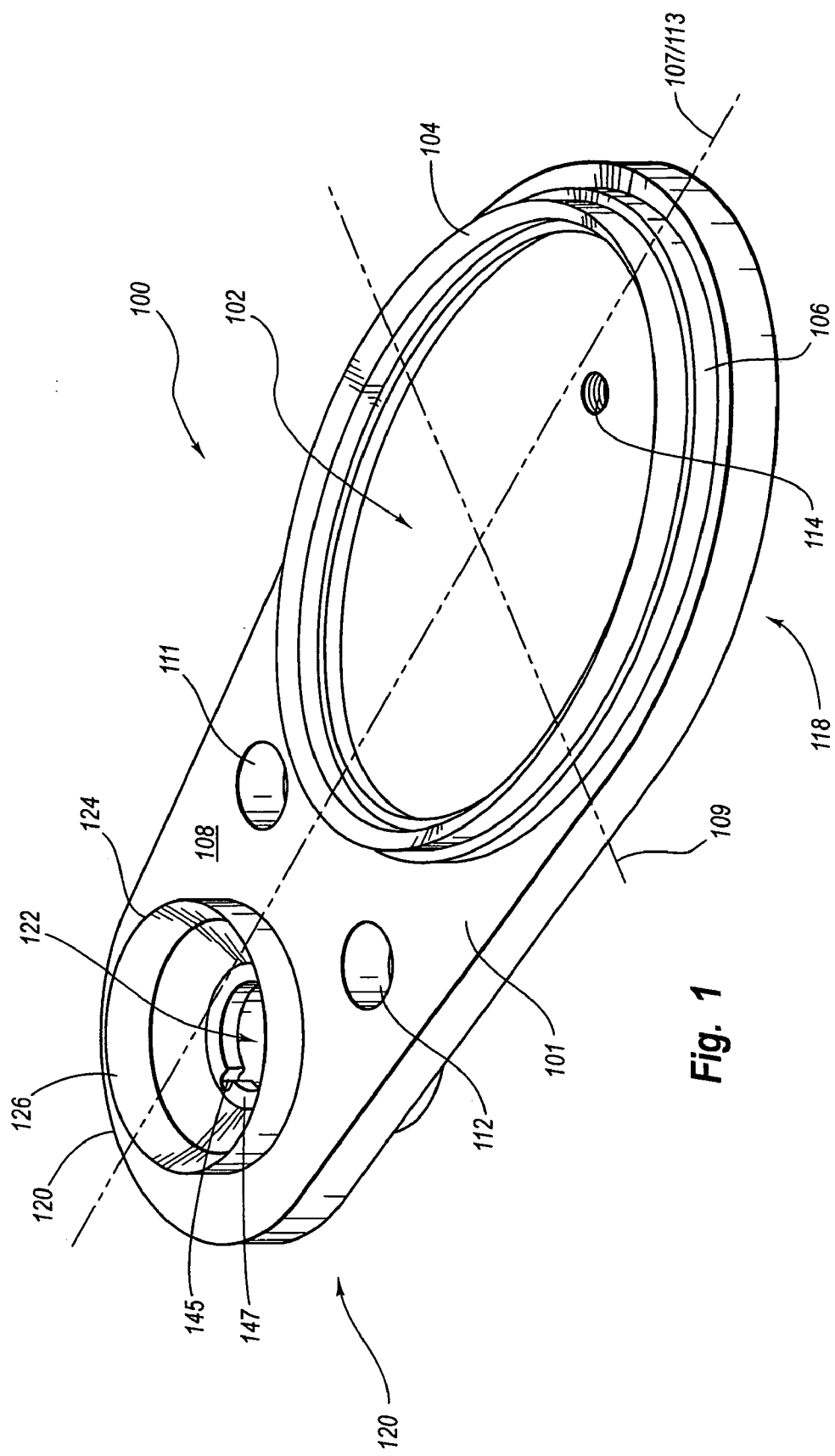
FIG. 1 is a perspective view of an aircraft defueling fitting according to one embodiment of the present invention.
Figure 2:
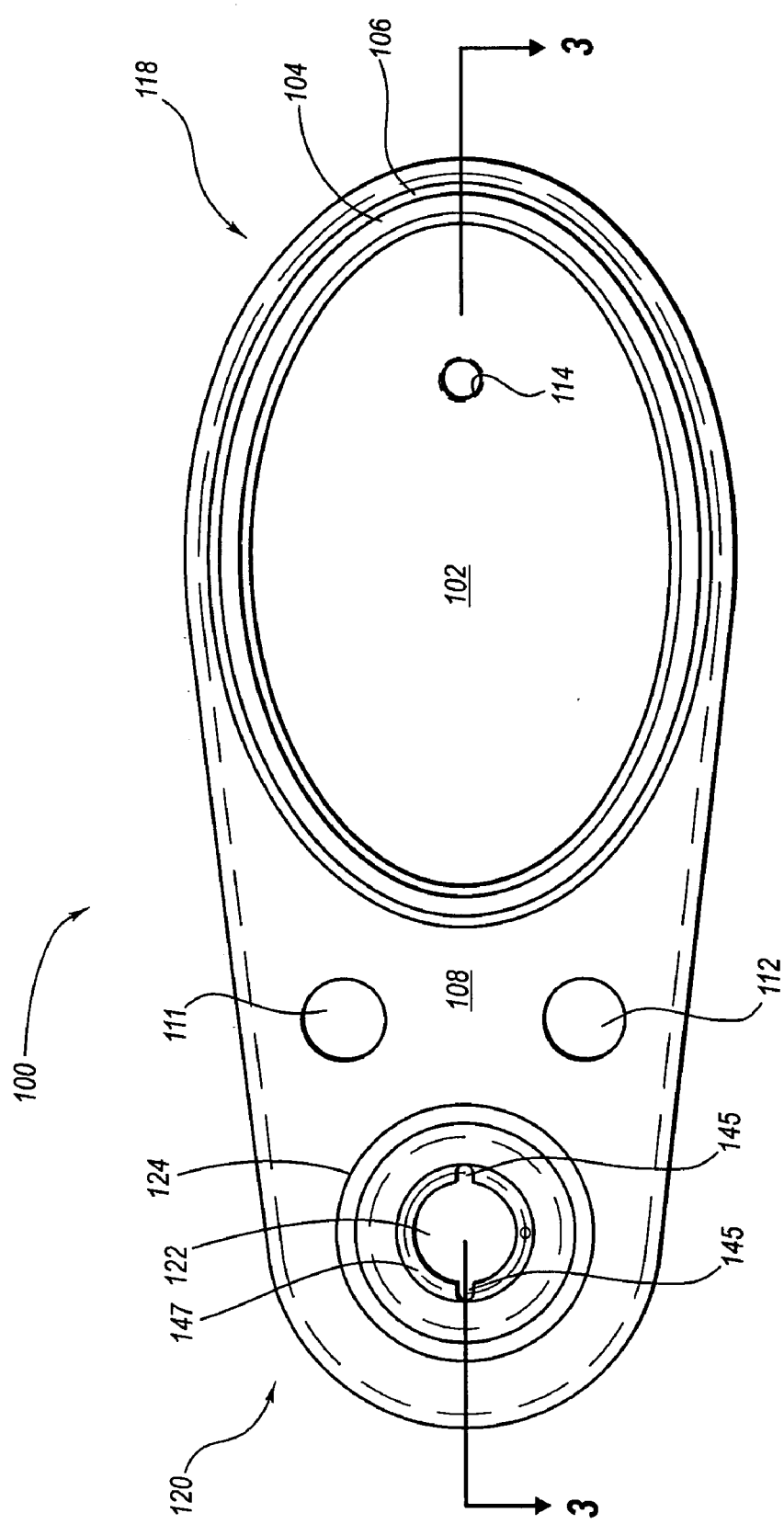
FIG. 2 is a top view of the aircraft defueling fitting shown in FIG. 1.
Figure 3:
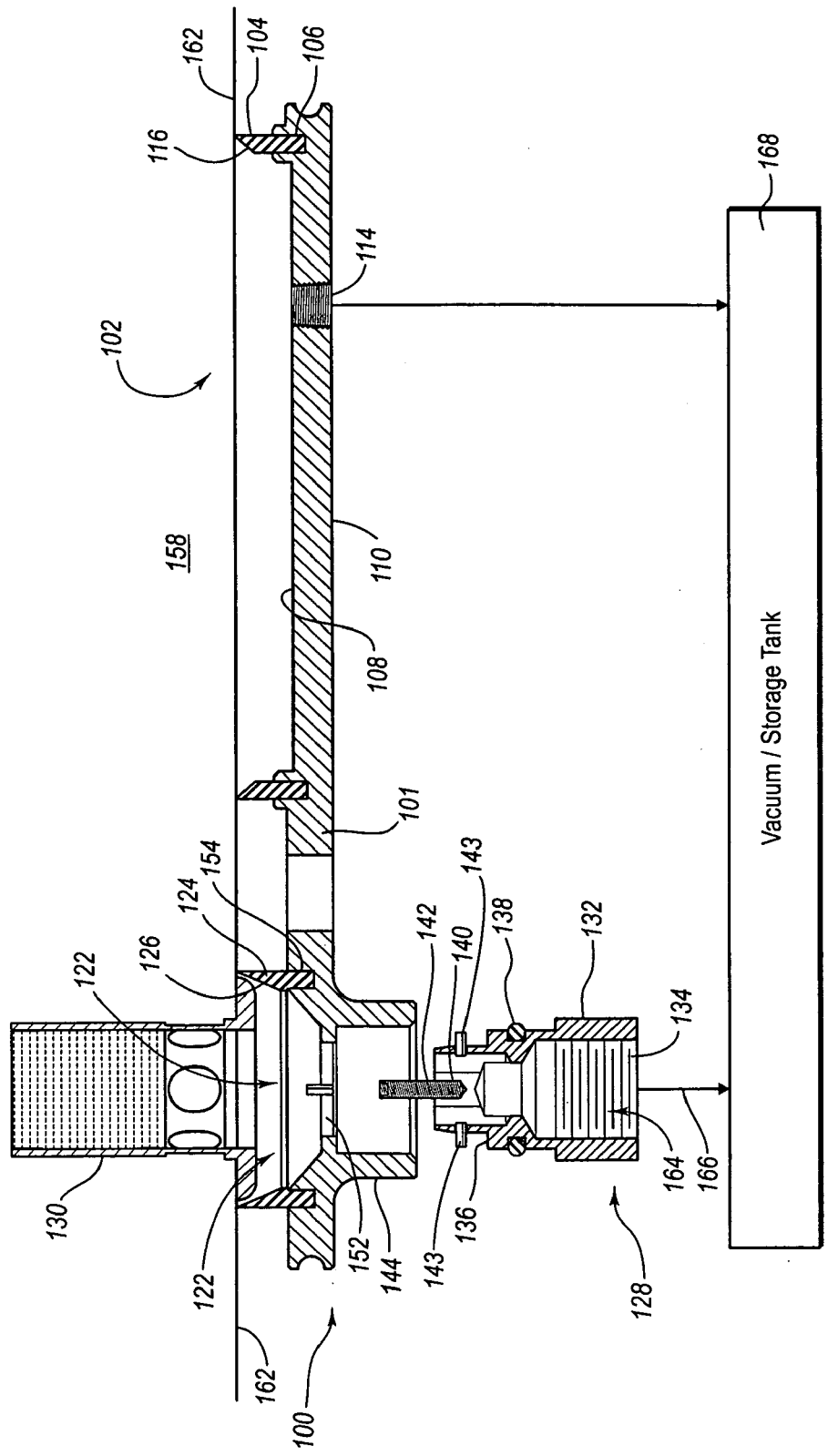
FIG. 3 is an exploded cross sectional view, taken along line 3—3, of the aircraft defueling fitting shown in FIG. 2, with the fitting attached to a surface of an aircraft and shown in schematic representation in relation to a tank and vacuum according to one embodiment of the present invention.

Turning now to the figures, and in particular to FIGS. 1–3, an aircraft defueling fitting 100 is shown according to principles of the present invention. The aircraft defueling fitting 100 includes a mount such as a mounting plate 101. According to the embodiment of FIGS. 1–3, the mounting plate 101 comprises an elongated member of decreasing width from a first end 118 to a second end 120. The mounting plate 101 includes first and second holes 111, 112, and a longitudinal axis 113. The first and second holes 111, 112 may function as hangers and are optional. The mounting plate 101 is made of structural material, such as aluminum, according to some embodiments. However, the mounting plate 101 may comprise other materials including, but not limited to metals, rubbers, plastics, ceramics, and/or composites.

A structural connector, which, according to FIGS. 1–3, comprises a suction plate or suction cup 102, is disposed in the mounting plate 101. The suction cup 102 includes a first surface 108, a second surface 110 (FIG. 3), a groove 106 disposed in the first surface 108, and a seal 104 disposed in the groove 106. The groove 106 is preferably a non-circular geometric shape and may be elliptical and continuous as shown, but is not necessarily so. The groove 106 of FIGS. 1–3 comprises a major axis 107 and minor axis 109. The major axis 107 may be coincident with or parallel to the longitudinal axis 113 of the mounting plate 101.

According to the embodiment of FIGS. 1–3, the groove 106 projects or is raised from the first surface 108 by a distance of approximately 0.0625 to 0.75 inches, preferably about 0.125 inches. However, the principles of the present invention contemplate other projection dimensions as well. The suction cup 102 includes a vacuum port 114 arranged interior to the groove 106 and may be centered or offset from center. According to the embodiment of FIGS. 1–3, the vacuum port 114 is offset from center. The vacuum port 114 may be threaded to facilitate connection to a vacuum source.

As mentioned above, a seal, such as the elastomeric seal 104, is disposed in the groove 106. The groove 106 and the elastomeric seal 104 extend or are raised from the first surface 108. The vacuum suction port 114 facilitates sealing the mounting plate 101 to an aircraft. According to FIGS. 1–3, the elastomeric seal 104 includes an exposed angled surface 116 seen most clearly in FIG. 3.

The aircraft defueling fitting 100 also includes an aperture such as an aircraft drain port 122 disposed in the mounting plate 101, but spaced laterally from the elastomeric seal 104. The aircraft drain port 122 is enclosed by a circumferential seal 124 that may be circular as shown in FIGS. 1–2. The circumferential seal 124 may include an exposed angled surface 126 seen most clearly in FIG. 3. The aircraft drain port 122 may also comprise a vacuum port and, when connected to a vacuum source, seal the circumferential seal 124 against an aircraft surface surrounding a drain valve and prevent fuel leaks during a defueling operation.

The aircraft defueling fitting 100 may also include an actuator assembly 128 shown in FIG. 3. The actuator assembly 128 of FIG. 3 functions as a poppet valve opener and is arranged transverse to the mounting plate 101. As mentioned above, most aircraft are equipped with poppet drain valves to facilitate defueling. The actuator assembly 128 opens fuel tank drain valves, such as an aircraft poppet valve 130 shown in FIG. 3, when the actuator assembly 128 is properly aligned with and inserted into the valve 130.

Continuing to refer to FIG. 3, the actuator assembly 128 comprises a probe 132 with internal threading 134 and a tapered end 136. The tapered end 136 includes a circumferential O-ring 138 and a recess 140 receptive of a pin insert 142. The length of the insert 142 may vary from one application to another depending on the stroke necessary to open the aircraft poppet valve 130. The actuator assembly 128 engages a neck or hub 144 receptive of the probe 142. According to the embodiment of FIG. 3, the hub 144 is flanged to receive the probe 132 and integral with the mounting plate 101. However, according to some embodiments, the hub 144 is a separate component attached to the mounting plate 101 at the drain port 122.

When the actuator assembly 128 is fully assembled, the probe 132 is inserted at least partially into the hub 144. The O-ring 138 seals an annulus between the hub 144 and the probe 132. A pair of wings 143 of the probe 132 is inserted through a matching groove 145 (FIG. 2) in the hub 144 and twisted to allow the probe 132 to rest on a ridge 147 (FIG. 2) of the hub 144. The pin insert 142 extends through the baffle 152 and through the hub 144. The hub 144 includes a recess 154 receptive of a gasket such as the circumferential seal 124. The circumferential seal 124 is preferably made of rubber or other sealing material.

The aircraft defueler fitting 100 may be used to effectively defuel an aircraft, including aircraft with fuel tank drain valves disposed in curved surfaces. For example, some airplane wings, fuselages, outboard removable pontoon tanks include poppet valves similar or identical to the poppet valve 130 shown in FIG. 3. The surfaces adjacent to these wings, fuselages, outboard removable pontoon tanks can be significantly curved, and it is difficult at best to attach suction fittings to curved surfaces. Consequently, the suction cup 102 may be elliptical to facilitate attachment to curved surfaces.

The suction cup 102 requires a certain amount of surface area and vacuum pressure (via the vacuum port 114) to adequately connect to an adjacent surface. However, if the suction cup is generally circular, a significantly curved surface may prevent a seal. For example, as shown in FIG. 4A, a defueling fitting 200 with a circular suction cup 202 may be incapable of creating a seal against a curved wing 203. Consequently, a width W of the defueling fitting 200 associated with the circular suction cup 202 prevents the defueling fitting 200 from connecting to the curved wing 203 or other curved aircraft surfaces (e.g. fuselage, outboard removable pontoon tanks, etc.).

Figure 4B:
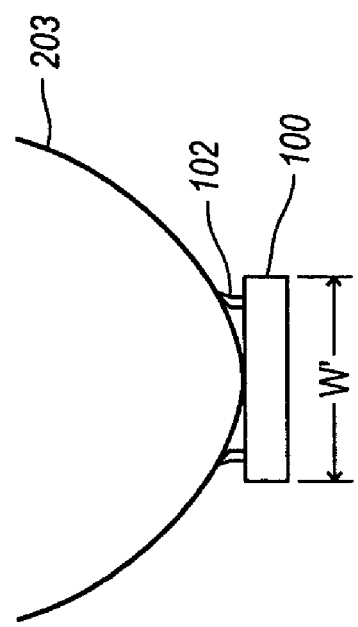
FIG. 4B is an end view of the aircraft defueling fitting of FIG. 1 shown sealed against the contoured aircraft surface shown in FIG. 4A.
Figure 4A:
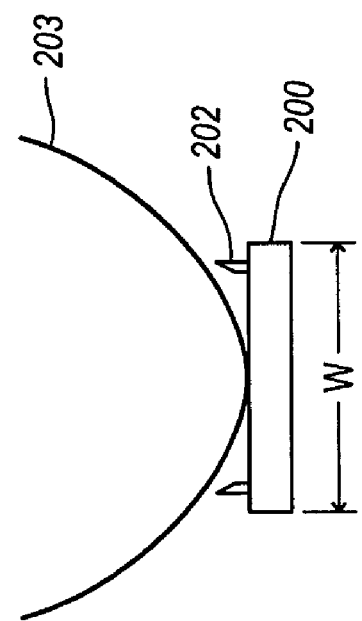
FIG. 4A is an end view of an aircraft defueling fitting with a wide structural connector adjacent to a contoured aircraft surface.

The elliptical suction cup 102 (FIG. 4B), on the other hand, may exhibit a similar surface area to the circular suction cup 202 and also seal against the curved wing 203 as shown in FIG. 4B. A reduced width W' of the aircraft defueler fitting 100 shown in FIG. 4B (as compared with the width W shown in FIG. 4A) facilitates connection to contoured surfaces such as airplane wings, fuselages, and outboard removable pontoon tanks. According to the embodiment of FIGS. 1–3 and 4B, the aircraft defueler fitting 100 is capable of sealing against a variety of contoured surfaces. For example, the aircraft defueler fitting 100 may seal against a surface having a radius of curvature of about one hundred twenty inches or less. The aircraft defueler fitting 100 may also be capable of sealing against a contoured surface having a radius of curvature of about seventy-two inches or less, thirty-six to forty-eight inches or less, or even contoured surfaces having a radius of curvature of about four to eighteen inches or less. The elliptical shape of the suction cup 102 and the raised groove 106, among other things, facilitate connection of the aircraft defueler fitting 100 to contoured surfaces.

As mentioned above, the aircraft defueling fitting may be associated with a vacuum system. Returning to FIG. 3, one or more fluid passageways 164 through the actuator assembly 128 are open to a connecting hose 166. When the aircraft defueling fitting 100 is connected to a surface 162 and the actuator assembly 128 is inserted into the hub 144 and aligned with the poppet valve 130, the fluid passageway 164 is in fluid communication with the poppet valve 130. Therefore, when the poppet valve 130 is opened, fuel in an aircraft 158 is drained to a storage/vacuum assembly 168 which provides both a vacuum source and a holding tank. The suction cup 102 and the actuator assembly 128 are both operatively connected to a vacuum of the storage/vacuum assembly 168 according to the embodiment of FIG. 3. The vacuum creates a pressure differential to seal the suction cup 102 against the surface 162 of the aircraft 158. The vacuum may also provide suction to the actuator assembly 128 for increased drain flow rates. It will be understood, however, that although the embodiment of FIG. 3 illustrates a common storage/vacuum assembly 168 operatively connected to both the suction cup 102 and the actuator assembly 128, the vacuum provided to the suction cup 102 and the vacuum and/or drainage line 166 connected to actuator assembly 128 may be separate and independent. In addition, multiple suction cups similar, congruent, identical, or different from the suction cup 102 shown in FIGS. 1–3 may also be added to the aircraft defueling fitting 100 and connected to a vacuum source to aid with connection. It should be noted that the lateral spacing between the suction cup 102 and the circumferential seal 124 of the drain port advantageously prevents cross-leaking therebetween. Therefore, if, for example, there is a leak from the circumferential seal 124, fluid from the aircraft will not cross into the suction cup 102 and damage any associated vacuum equipment.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the scope of the invention.

The invention claimed is:

1. An aircraft defueling fitting, comprising:
   a structural connector comprising first and second surfaces;
   an elliptical seal disposed in the first surface of the structural connector;
   an aircraft drain port adjacent to the elliptical seal.

2. An aircraft defueling fitting according to claim 1 wherein the structural connector and the aircraft drain port are disposed in a single mount.

3. An aircraft defueling fitting according to claim 1 wherein the structural connector and the aircraft drain port are disposed in a single mount; wherein the mount comprises an elliptical groove projecting from the first surface, the seal disposed in the elliptical groove.

4. An aircraft defueling fitting according to claim 1, further comprising a vacuum port disposed in the structural connector.

5. An aircraft defueling fitting according to claim 1, further comprising a vacuum port disposed in the structural connector, wherein the vacuum port is operatively connected to a vacuum source at the second surface.

6. An aircraft defueling fitting according to claim 1 wherein the aircraft drain port is in fluid communication with a vacuum source and a holding lank.

7. An aircraft defueling fitting according to claim 1, further comprising a circumferential seal around the aircraft drain port.

8. An aircraft defueling fitting, comprising:
a mount having first and second ends;
a first non-circular suction area disposed in the first end of the mount and a second suction area disposed in the second end of the mount;
a poppet valve opener disposed in the mount within the second suction area.

9. An aircraft defueling fitting according to claim 8 wherein the first non-circular suction area comprises a generally elliptical shape having a major elliptical axis substantially parallel to a major axis of the mount.

10. An aircraft defueling fitting according to claim 8 wherein the first non-circular suction area is defined by a seal disposed in a raised groove of the mount.

11. An aircraft defueling fitting according to claim 8 wherein the mount comprises an aperture, the poppet valve opener disposed in the aperture.

12. An aircraft defueling fitting according to claim 8 wherein the poppet valve opener comprises:
a hub having an internal passageway therethrough and an external trough;
a probe inserted at least partially into the hub;
a hub gasket at least partially inserted into the external trough defining extents of the second suction area.

13. An aircraft defueling fitting according to claim 8 wherein the poppet valve opener comprises:
a hub having an internal passageway therethrough and an external trough;
a probe inserted at least partially into the hub;
further comprising a removable insert disposed in the probe and extending through the hub.

14. An aircraft defueling fitting according to claim 8 wherein the first end is wider than the second end.

15. An aircraft defueling fitting, comprising:
a mount having first and second ends;
a trough arranged in a closed, geometric shape, the trough raised from a mount surface;
a first seal disposed in the trough;
a drain port disposed in the mount;
a valve actuator assembly attached to the mount at the second end and adapted to open an aircraft fuel tank drain valve.

16. An aircraft defueling fitting according to claim 15 wherein the closed, geometric shape comprises an ellipse.

17. An aircraft defueling fitting according to claim 15 wherein the trough is raised such that the seal fully seals against a contoured surface having a radius of curvature of one hundred twenty inches or less.

18. An aircraft defueling fitting according to claim 15 wherein the trough is raised such that the seal fully seals against a contoured surface having a radius of curvature of seventy-two inches or less.

19. An aircraft defueling fitting according to claim 15 wherein the trough is raised such that the seal fully seals against a contoured surface having a radius of curvature of thirty-six inches or less.

20. An aircraft defueling fitting according to claim 15 wherein the trough is raised such that the seal fully seals against a contoured surface having a radius of curvature of eighteen inches or less.

21. An aircraft defueling fitting according to claim 15 wherein the mount comprises a longitudinal axis, wherein the closed, geometric shape comprises an ellipse having a major axis aligned with the longitudinal axis.

22. An aircraft defueling fitting according to claim 15 wherein the valve actuator assembly comprises a second seal spaced laterally from the seal disposed in the trough, wherein the mount comprises a first vacuum port disposed interior to the trough, and the drain port comprises a second vacuum port disposed interior to the second seal.

23. A method of removing fuel from an aircraft fuel tank, comprising providing an aircraft drain fitting and pneumatically attaching the aircraft drain fitting to an aircraft surface having a radius of curvature of one hundred twenty inches or less.

24. A method of removing fuel from an aircraft fuel tank according to claim 23 wherein the pneumatically attaching comprises attaching the aircraft drain fitting to an aircraft surface having a radius of curvature of seventy-two inches or less.

25. A method of removing fuel from an aircraft fuel tank according to claim 23 wherein the providing an aircraft drain fitting further comprises:
providing a structural connector comprising first and second surfaces;
providing an elliptical seal disposed in the first surface of the structural connector;
providing an aircraft drain port adjacent to the elliptical seal.

26. A method of removing fuel from an aircraft fuel tank according to claim 23, further comprising drawing fuel from the aircraft fuel tank with a vacuum source attached to the aircraft drain fitting.

27. A method of removing fuel from an aircraft fuel tank, comprising providing an aircraft drain fitting and pneumatically attaching the aircraft drain fitting to an aircraft surface having a radius of curvature of one hundred twenty inches or less, wherein the pneumatically attaching comprises applying a vacuum to a suction cup of the aircraft drain fitting.

28. A method of removing fuel from an aircraft fuel tank according to claim 23, further comprising:
providing an actuator assembly in the aircraft drain fitting for opening an aircraft poppet valve of the aircraft fuel tank;
depressing the aircraft poppet valve with the actuator.

29. An aircraft defueling fitting, comprising:
a structural connector comprising first and second surfaces;
a non-circular seal disposed in the first surface of the structural connector;
an aircraft drain port laterally adjacent to the non-circular seal.

* * * * *